(12) United States Patent
Stoll (10) Patent No.: US 6,402,251 B1
(45) Date of Patent: Jun. 11, 2002

(54) VEHICLE PASSENGER SAFETY DEVICES

(76) Inventor: Louise F. Stoll, 1509 N. Colonial Ct., Arlington, VA (US) 22209

( * ) Notice: Subject to any disclaimer, the term of this patent is extended or adjusted under 35 U.S.C. 154(b) by 0 days.

(21) Appl. No.: 09/643,868

(22) Filed: Aug. 23, 2000

Related U.S. Application Data (60) Provisional application No. 60/150,355, filed on Aug. 24, 1999.

(51) Int. Cl.$^7$ .................. A47D 15/00; A62B 35/00; B60R 21/02; B60R 22/12
(52) U.S. Cl. .................. 297/485; 297/484; 297/255; 297/256; 297/256.15; 297/250.1
(58) Field of Search .................. 297/485, 468, 297/484, 250.1, 256.16, 256.15, 254, 255, 256, 219.12, 230.1, 230.13, 230.14, 486, 487, 17, 452.41

(56) References Cited

U.S. PATENT DOCUMENTS

| | | | | |
|---|---|---|---|---|
| 1,123,278 A | * | 1/1915 | Hallett | 297/484 |
| 1,288,170 A | * | 12/1918 | Pick | 297/484 |
| 1,300,914 A | * | 4/1919 | Barnhart | 297/484 |
| 1,310,958 A | * | 7/1919 | O'Connor | 297/484 |
| 1,316,163 A | * | 9/1919 | Kennedy | 297/484 |
| 1,369,456 A | * | 2/1921 | Meredith | 297/484 |
| 1,697,363 A | * | 1/1929 | Losey | 297/484 |
| 1,816,262 A | * | 7/1931 | Ritter | 297/484 |
| 1,897,882 A | * | 2/1933 | Beagan | 297/484 |
| 1,930,378 A | * | 10/1933 | Beagan | 297/484 |
| 2,132,556 A | * | 10/1938 | Blackshaw | 297/484 |
| 2,413,395 A | * | 12/1946 | Ware | 297/484 X |
| 2,570,631 A | * | 10/1951 | Arrasmith | 297/484 X |
| 3,062,585 A | * | 11/1962 | Bentley | 297/484 |
| 3,107,942 A | | 10/1963 | Rivkin | |
| 3,125,375 A | * | 3/1964 | Bird et al. | 297/484 X |
| 3,428,029 A | * | 2/1969 | Klickstein et al. | 297/484 |
| 3,707,008 A | * | 12/1972 | Fellin et al. | 297/219.12 X |

(List continued on next page.)

OTHER PUBLICATIONS

DME Corporation—CRS—2000 Child Restraint Device (www.dmecorp.com/fllaviation/fll–av9–crd/av9–crd_hires, html.

DME Corporation—CRS—2000 Child Restraint Device (www.dmecorp.com/fllaviation/fll–av9–crd/av9–crd_hires2.html.

DME Corporation—CRS—2000 Child Restraint Device (www.dmecorp.com/fllaviation/fll–av9–crd/av9–crd_hires3.html.

DME Corporation—CRS—2000 Child Restraint Device (www.dmecorp.com/fllaviation/fll–av9–crd/av9–crd_desc.html.

DME Corporation—CRS—2000 Child Restraint Device (www.dmecorp.com/fllaviation/fll–av9–crd/av9–crd_spec.html.

DME Corporation—CRS—2000 Child Restraint Device (www.dmecorp.com/fllaviation/fll–av9–crd/av9–crd_faqs.html.

*Primary Examiner*—Peter M. Cuomo
*Assistant Examiner*—Rodney B. White
(74) *Attorney, Agent, or Firm*—Poh C. Chua; Shaw Pittman LLP (57) ABSTRACT

A passenger safety device for use on vehicles such as airplanes and automobiles is disclosed. In a first embodiment, the device is a "soft" device, i.e., a safety harness comprising exclusively straps and fasteners. A horizontal strap wraps around the back-support of a vehicle seat to secure the harness to the vehicle seat. In a second embodiment, the device comprises a back-support portion and a seat-pan portion. When folded, the exterior frame resembles a small briefcase with a shoulder strap. In a third embodiment, the device comprises a rigid front-support with an inflatable cushion that fills up the space between the passenger and the front-support.

24 Claims, 6 Drawing Sheets

U.S. PATENT DOCUMENTS

| | | | |
|---|---|---|---|
| 3,794,379 A | 2/1974 | Furey | 297/256.13 |
| 4,026,245 A | 5/1977 | Arthur | |
| 4,234,229 A | 11/1980 | Arnold | 297/487 X |
| 4,396,228 A | 8/1983 | Go | 297/484 |
| 4,527,830 A * | 7/1985 | Meyers | 297/17 X |
| 4,709,966 A * | 12/1987 | Parkinson et al. | 297/484 X |
| 4,759,311 A | 7/1988 | Boyle | |
| 4,900,086 A | 2/1990 | Steward | |
| 4,915,446 A | 4/1990 | Darling et al. | 297/256.14 |
| 5,056,869 A * | 10/1991 | Morrison | 297/485 |
| 5,080,441 A | 1/1992 | Stevenson et al. | 297/467 X |
| 5,118,163 A | 6/1992 | Brittian et al. | 297/254 X |
| 5,215,354 A * | 6/1993 | Grene | 297/485 |
| 5,219,203 A | 6/1993 | Switlik | 297/488 X |
| 5,224,229 A | 7/1993 | Smith | 297/264 X |
| 5,226,698 A * | 7/1993 | Harrison | 297/485 |
| 5,232,263 A | 8/1993 | D'Ull et al. | 297/464 |
| 5,255,184 A | 10/1993 | Hornick et al. | |
| 5,265,828 A | 11/1993 | Bennington | |
| 5,289,369 A | 2/1994 | Hirshberg | |
| 5,299,855 A * | 4/1994 | Zubeck | 297/485 |
| 5,310,242 A | 5/1994 | Golder | 297/256 X |
| 5,335,968 A * | 8/1994 | Sheridan et al. | 297/255 X |
| 5,344,212 A | 9/1994 | Muller et al. | 297/254 X |
| 5,354,121 A * | 10/1994 | Allum | 297/485 |
| 5,395,154 A * | 3/1995 | Wang | 297/256.15 X |
| 5,397,171 A * | 3/1995 | Leach | 297/485 |
| 5,435,272 A * | 7/1995 | Epstein | 297/484 X |
| 5,496,092 A * | 3/1996 | Williams et al. | 297/250.1 |
| 5,511,850 A * | 4/1996 | Coursey | 297/256.15 X |
| 5,516,188 A * | 5/1996 | Bruhnke et al. | 297/250.1 X |
| 5,540,403 A | 7/1996 | Standley | 297/484 X |
| 5,588,699 A | 12/1996 | Rundle et al. | 297/488 X |
| 5,628,548 A * | 5/1997 | Lacoste | 297/485 X |
| 5,649,744 A * | 7/1997 | Apodaca | 297/485 |
| 5,652,867 A | 7/1997 | Barlow et al. | 297/256.16 X |
| 5,653,501 A * | 8/1997 | Goor | 297/250.1 X |
| 5,655,817 A * | 8/1997 | Nienow | 297/250.1 X |
| 5,660,445 A * | 8/1997 | Murray | 297/485 |
| 5,664,844 A * | 9/1997 | Greene | 297/485 |
| 5,673,969 A | 10/1997 | Frazier | |
| 5,676,426 A * | 10/1997 | Herring | 297/485 X |
| 5,697,580 A | 12/1997 | Reinhardt | |
| 5,711,574 A * | 1/1998 | Barnes | 297/250.1 X |
| 5,726,885 A | 3/1998 | Klein et al. | |
| 5,733,014 A * | 3/1998 | Murray | 297/485 |
| 5,785,383 A | 7/1998 | Otero | 297/255 |
| 5,803,542 A * | 9/1998 | Insausti | 297/256 |
| 5,803,543 A * | 9/1998 | Hartmann | 297/256 |
| 5,813,367 A | 9/1998 | O'Brien | 297/468 X |
| 5,839,965 A * | 11/1998 | Mullins | 297/485 X |
| 5,868,463 A * | 2/1999 | MacKenzie et al. | 297/255 X |
| 5,890,769 A * | 4/1999 | Fairbanks | 297/485 X |
| 5,899,467 A | 5/1999 | Henkel | |
| 5,909,927 A | 6/1999 | Henshall | 297/485 X |
| 5,915,787 A | 6/1999 | Brookman | 297/256.16 X |
| 5,915,789 A * | 6/1999 | Ponce De Leon, III | 297/485 X |
| 5,918,209 A | 6/1999 | Campbell et al. | |
| 5,953,706 A | 9/1999 | Patel | |
| 5,988,744 A * | 11/1999 | Franchak | 297/219.12 X |
| 6,006,967 A * | 12/1999 | Tsao | 297/485 X |
| 6,007,156 A * | 12/1999 | Chang | 297/485 X |
| 6,015,190 A * | 1/2000 | Wend | 297/17 X |
| 6,095,613 A * | 8/2000 | Ostrander et al. | 297/485 X |
| 6,109,698 A * | 8/2000 | Perez | 297/484 |

* cited by examiner

VEHICLE PASSENGER SAFETY DEVICES

This application claims benefit of provisional application 60/150,355, filed Aug. 24, 1999.

FIELD OF THE INVENTION

The present invention relates generally to vehicular safety devices and more specifically to passenger safety devices for use on vehicles such as airplanes and automobiles.

BACKGROUND OF THE INVENTION

The National Transportation Safety Board (NTSB) has reported that the use of seat belts on airplanes has reduced injuries and saved lives during air turbulence and air crashes. The utility of airplane seat belts has prompted the Federal Aviation Administration (FAA) to promulgate rules requiring all airlines to provide seat belts to their passengers. However, despite the FAA regulations, not every airplane passenger receives the full protection of a seat belt. For example, children under 40 pounds do not receive the full benefit from seat belts that are designed for adults. As there is no federal regulation requiring the provision of seat belts specifically designed for children lighter than 40 pounds, airlines do not provide them. This inequity to young passengers is aggravated by the fact that airlines often require children over the age of two to buy a ticket without affording these young travelers the same protection other passengers receive.

Until the law requires the use of airplane child safety devices, children will continue to suffer from injuries, sometimes fatal injuries, during air turbulence or air crashes. The current practice of adults holding on to children is simply inadequate. The NTSB has reported numerous instances in which children held by an adult during air turbulence or air crashes suffer from severe injuries, including fatal injuries. The NTSB has also reported that child safety belts currently used in a limited number of smaller airplanes have saved the lives of young passengers.

Taking the initiative to provide adequate protection to their children, some parents have attempted to use car seats in airplanes. Currently, only six car seats manufactured in the United States comply with FAA standards for use in airplanes. Although some of these car seats fit and buckle in more easily than others in an airplane, all such car seats are heavy, cumbersome, and awkward to handle. The FAA and the NHTSA (National Highway Transportation Safety Administration) have reported that many car seats are not suitable for use in airplanes either because they are too wide to fit into the airplane seats or because the rows of airplane seats are too close together to accommodate them. Parents who use car seats in airplanes must also haul them through airports, which often creates problems at security checks. In the past, some airlines even prohibited parents from using car seats. As crash safety test results began to demonstrate the danger of carrying infants in the arms of adults and using ordinary seat belts for toddlers, the FAA passed a rule prohibiting airlines from banning car seats on airplanes. Nonetheless, some airlines continue to prohibit their flight attendants from assisting parents with the installation of car seats in airplanes.

Therefore, it is apparent that children lighter than 40 pounds can still benefit from the protection of an airplane child safety device as much as an adult can benefit from the use of a seat belt. However, it appears that airlines will continue to be reluctant to provide airplane child safety devices for at least two reasons. First, existing car seats that comply with FAA standards are not user-friendly and their use could adversely affect flight schedules. Second, the airlines do not have a system to handle the logistics associated with the provision of the car seats in reservation, delivery, storage, maintenance, and redistribution.

Although each airline uses its own proprietary airline reservation system, all airline reservation systems do essentially the same things. All reservation systems reserve a place on an airplane and record a fair amount of information about the passenger such as the passenger's credit card number, preference for an aisle or window seat, special meal request, frequent flyer number, and so on. Passengers who regularly use a particular travel agent often have a travel "profile" that automatically downloads when a reservation is made. However, while some data in the agent's profile is automatically downloaded, the choice of a special meal or seat preference must be "clicked in" to the ticket reservation system separately by the travel agent with each reservation. Because no airline is providing airplane child safety devices, the current reservation systems do not record whether a vehicle child safety device has been requested.

The level of demand for child safety devices and a system to provide them to air travel passengers would increase if a regulation were promulgated to require the use of child safety devices on airplanes for children lighter than 40 pounds. In addition, the demand for child safety devices and a system to provide them would increase if airlines voluntarily make the devices available as part of a "passenger bill of rights." Currently, there is considerable interest in expanding passenger rights to include "appropriate safe devices" for children. "Forward thinking" airlines might view the provision of airplane child safety devices as giving them a competitive edge.

SUMMARY OF THE INVENTION

The present invention is a passenger safety device that can be used in different vehicles including airplanes and automobiles. Three specific embodiments are disclosed. In a first embodiment, the present invention is a "soft" vehicle safety device, i.e., it is a harness made exclusively of straps and fasteners. In this embodiment, the present invention has two vertical straps, a strap-holding belt, and a horizontal strap. When the present invention is installed, the horizontal strap wraps around the back-support of a vehicle seat. Preferably, the horizontal strap is length adjustable having a fastener and an adjustable portion. The vertical straps rest over the back-support of the vehicle seat. Each of the vertical straps is attached to the horizontal strap. Preferably, the vertical straps are sewn to the horizontal strap. The second end of each of the vertical straps has a loop to incorporate the existing vehicle seat belt. In a preferred embodiment, the loop can be "sealed" tightly by the use of hook-and-loop fasteners. The strap-holding belt is located below the horizontal strap, and it is designed to be fastened around a passenger's chest to keep the vertical straps in place.

A second embodiment of the present invention resembles a folding seat. In this embodiment, the present invention comprises a seat-pan, a back-support, a hinge connecting the seat-pan and back-support, a horizontal strap, two vertical straps attached to the horizontal strap, and a crotch strap attached to the seat-pan. In its folded position, the present invention resembles a small briefcase with a to shoulder strap. Preferably, when deployed, a pair of small "feet" can be snapped out at the bottom of the seat-pan to tilt the seat-pan toward the back-support slightly. The existing vehicle seat belt feeds through a loop located at the bottom of the seat-pan to hold it in place. The horizontal strap wraps around the vehicle seat and is tightened to hold the present invention in place.

In a third embodiment, the present invention comprises a rigid front-support with an inflatable cushion to fill up the space between the passenger and the rigid front-support. The rigid front-support is made of tough polyurethane or another similar material. An inflatable cushion attached to the rigid front-support has a pump for use to inflate the cushion. To provide additional restraint, a pair of cross-straps is provided. These cross-straps are attached to the rigid front-support and the horizontal strap. The inflatable cushion, when not inflated to surround the passenger, is folded inside the rigid front frame.

Accordingly, it is the object of the present invention to improve passenger safety by providing vehicle passenger safety devices that are lightweight, portable, and easy to install. This and other objects of the present invention are described in greater detail in the detailed description of the invention, the appended drawings, and the attached claims.

DETAILED DESCRIPTION OF THE INVENTION

Figure 1A:
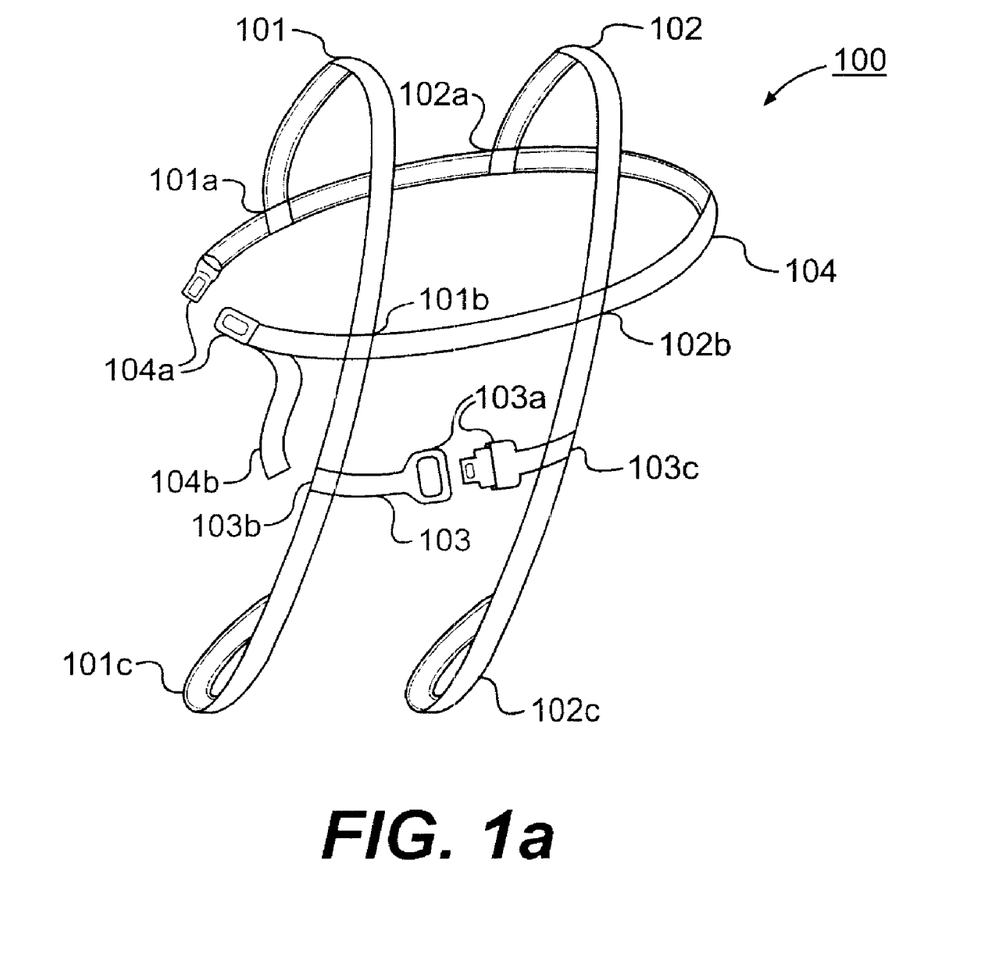
FIG. 1a is a schematic diagram of a first embodiment of a vehicle passenger safety device.

FIG. 1a is a schematic diagram of a first embodiment of the present invention showing vehicle passenger safety device 100. As shown in FIG. 1a, this embodiment of the present invention comprises a pair of vertical straps 101 and 102, strap-holding belt 103, and horizontal strap 104. Vertical strap 101 is attached to horizontal strap 104 at locations 101a and 101b. Similarly, vertical strap 102 is attached to horizontal strap 104 at locations 102a and 102b. Preferably, vertical straps 101 and 102 are sewn to horizontal strap 104 at locations 101a, 101b, 102a, and 102b. In addition, vertical straps 101 and 102 have loops 101c and 102c, respectively. Strap-holding belt 103 is attached to vertical strap 101 at location 103b, and to vertical strap 102 at location 103c. Preferably, strap-holding belt 103 has a fastener 103a. The preferred fastener is a buckle. Preferably, strap-holding belt 103 is sewn to vertical straps 101 and 102 at locations 103b and 103c, respectively. Horizontal strap 104 has a fastener 104a, such as a buckle, and an adjustable portion 104b that can be length-adjusted to tighten horizontal strap 104 around the back-support of an existing vehicle seat such as an airplane seat.

Figure 1B:
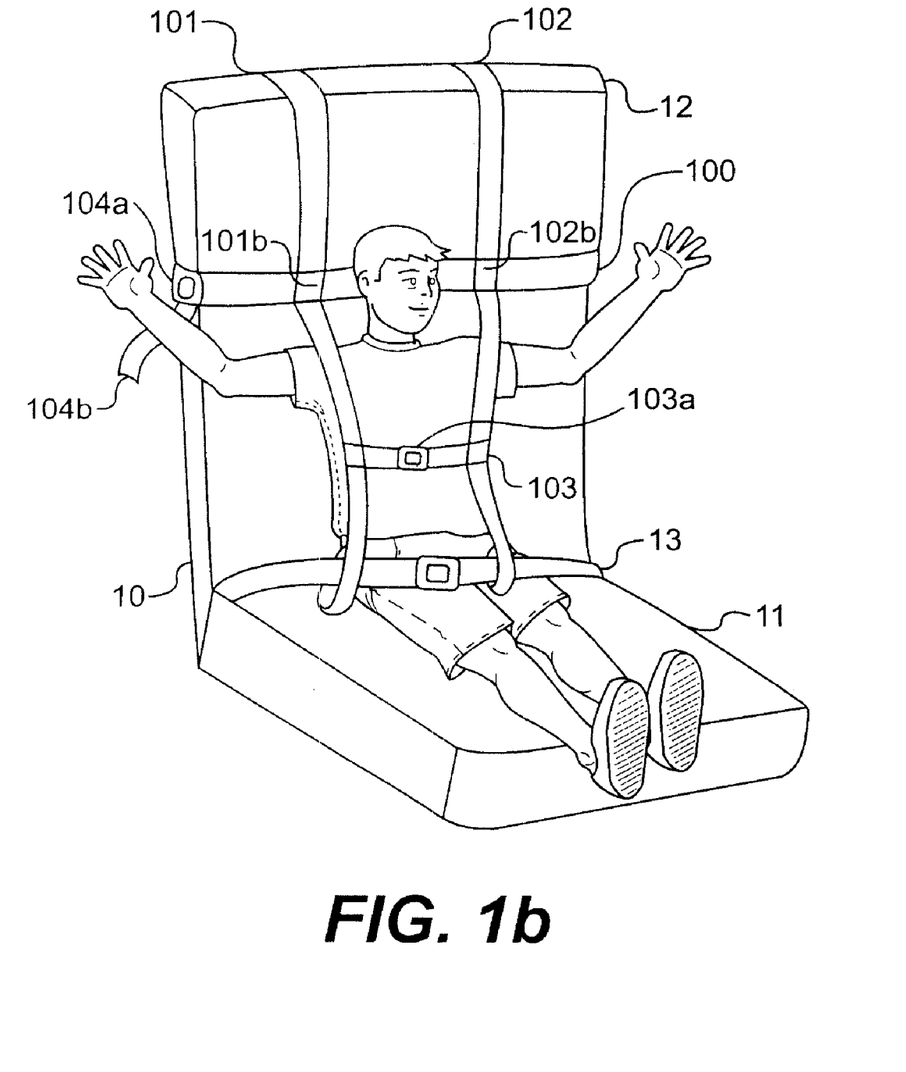
FIG. 1b is a schematic diagram of the vehicle passenger safety device of FIG. 1a shown in use on an existing vehicle seat.

FIG. 1b is a schematic diagram of vehicle passenger safety device 100 in use on existing airplane seat 10 having seat-pan 11, back-support 12, and seat belt 13. To use vehicle passenger safety device 100 on existing airplane seat 10, a passenger is seated on seat-pan 11. Vertical straps 101 and 102 are rested over back-support 12 of existing airplane seat 10 so that locations 101a, 101b, 102a, and 102b are all at about the same elevation. Horizontal strap 104 is then wrapped around back-support 12, above and behind the food tray of airplane seat 10 and above or behind the passenger's head. Fastener 104a is then engaged and adjustable portion 104b is pulled. Vertical straps 101 and 102 are then placed over the passenger's shoulders. Seat belt 13 is then fed through loops 101c and 102c of vertical straps 101 and 102, respectively, and seat belt 13 is buckled and tightened. In a preferred embodiment, loops 101c and 102c can be "sealed" tightly by the use of hook-and-loop fasteners such as Velcro™. Finally, strap-holding belt 103 is secured by engaging a fastener such as buckle 103a. The first embodiment of the present invention is made exclusively of straps and fasteners.

To uninstall vehicle passenger safety device 100, existing airplane seat belt 13, horizontal strap 104, and strap-holding belt 103 are detached. Existing airplane seat belt 13 is taken out of loops 101c and 102c, and the passenger safety device is lifted from back-support 12. The device can then be folded and stored in a small bag or box.

Figure 2A:
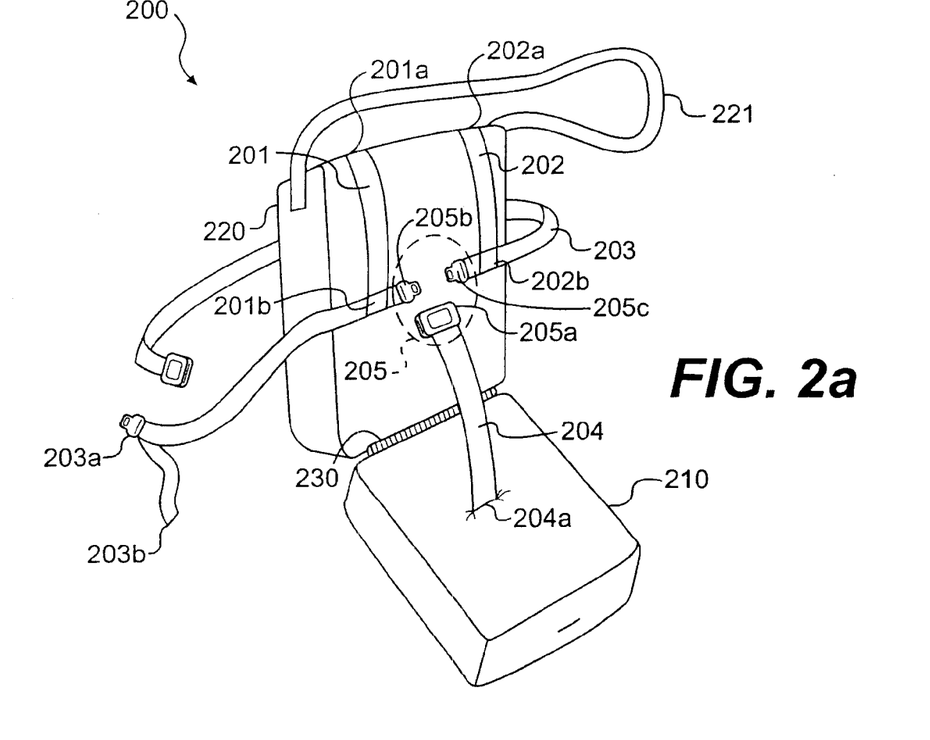
FIG. 2a is a schematic diagram of a second embodiment of a vehicle passenger safety device.
Figure 2B:
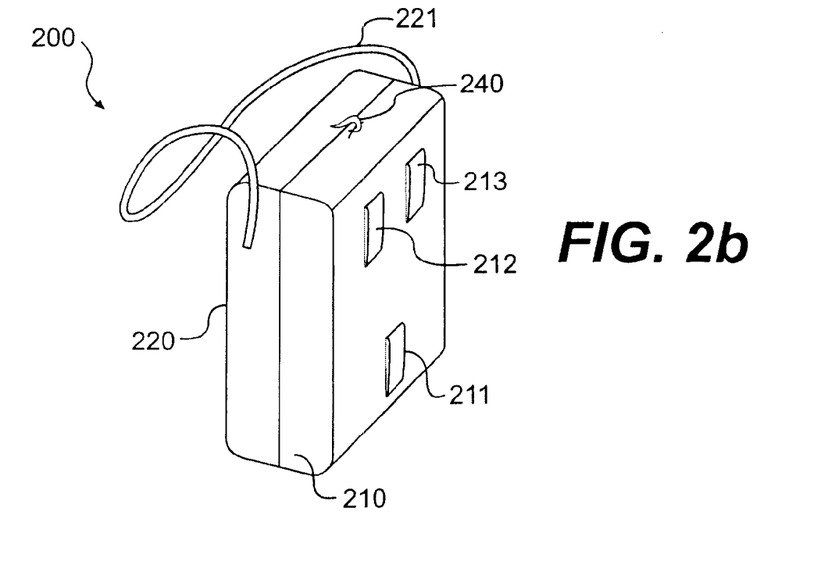
FIG. 2b is a schematic diagram of the vehicle passenger safety device of FIG. 2a shown in its folded position.

FIG. 2a is a schematic diagram of a second embodiment of a vehicle passenger safety device 200 having seat-pan portion 210, back-support portion 220, and hinge 230 connecting seat-pan portion 210 and back-support portion 220. Seat-pan portion 210 and back-support portion 220 preferably have rigid exterior frames and padded interiors. In addition, back-support portion 220 has vertical straps 201 and 202, attached to back-support portion 220 at locations 201a and 202a, respectively. Horizontal strap 203 is attached, preferably by sewing, to vertical strap 201 at location 201b and to vertical strap 202 at location 202b. Portions 205a, 205b, and 205c are three components of three-way fastener 205. Horizontal strap 203 has fastener 203a, adjustable portion 203b, and portions of three-way fastener 205b and 205c. Fasteners 203a and 205 are preferably buckles. The first end of crotch strap 204 is secured to seat-pan portion 210 at location 204a. The second end of crotch strap 204 has portion 205a of three-way fastener 205. Shoulder strap 221 is installed on back-support portion 220. Alternatively, shoulder strap 221 can be installed on seat-pan portion 210. In addition, as shown in FIG. 2b, there is loop 211 and a pair of legs 212 and 213 under seat-pan portion 210.

Figure 2C:
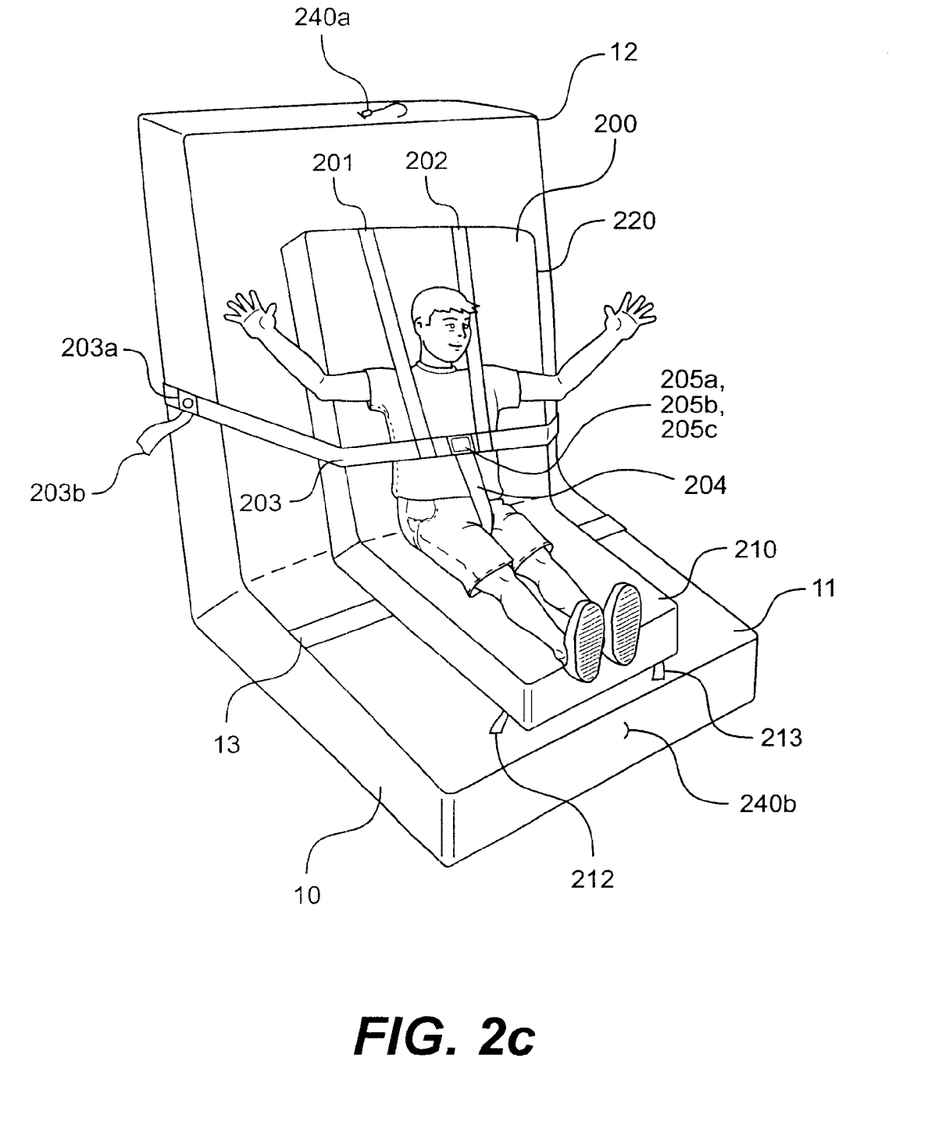
FIG. 2c is a schematic diagram of the vehicle passenger safety device of FIG. 2a shown in use on an existing vehicle seat.

FIG. 2c is a schematic diagram of vehicle passenger safety device 200 shown in use on an existing vehicle seat such as an airplane seat. To install vehicle passenger safety device 200, it is first unfolded as shown in FIG. 2a. Seat-pan portion 210 is then placed on existing airplane seat-pan 11. Back-support portion 220 is rested against existing back-support 12 with shoulder strap 221 hidden in between back-support portion 220 and existing back-support 12. Existing airplane seat belt 13 is then fed through loop 211 under seat-pan portion 210 and fastened. Legs 212 and 213 are then snapped out of seat-pan portion 210 to provide an angle as shown in FIG. 2c. A passenger is then seated on seat-pan portion 210 with the crotch strap 204 in between the passenger's legs. Vertical straps 201 and 202 are rested over the passenger's shoulders, and horizontal strap 203 is wrapped around him. Fastener 205 is then engaged. Finally, horizontal strap 203 is fastened by engaging fastener 203a and pulling adjustable portion 203b.

To uninstall, fastener 203a and fastener 205 are disengaged. The passenger is then lifted from seat-pan portion 210. Existing airplane seat belt 13 is then unbuckled and taken out of loop 211. Legs 212 and 213 are snapped back under seat-pan portion 210. Finally, horizontal strap 203, vertical straps 201 and 202, and crotch strap 204 is placed on seat-pan portion 210. Back-support portion 220 is then folded toward seat-pan portion 210. A hook 240a fitting into latch 240b is used to maintain the vehicle passenger safety device in its folded position.

Figure 3A:
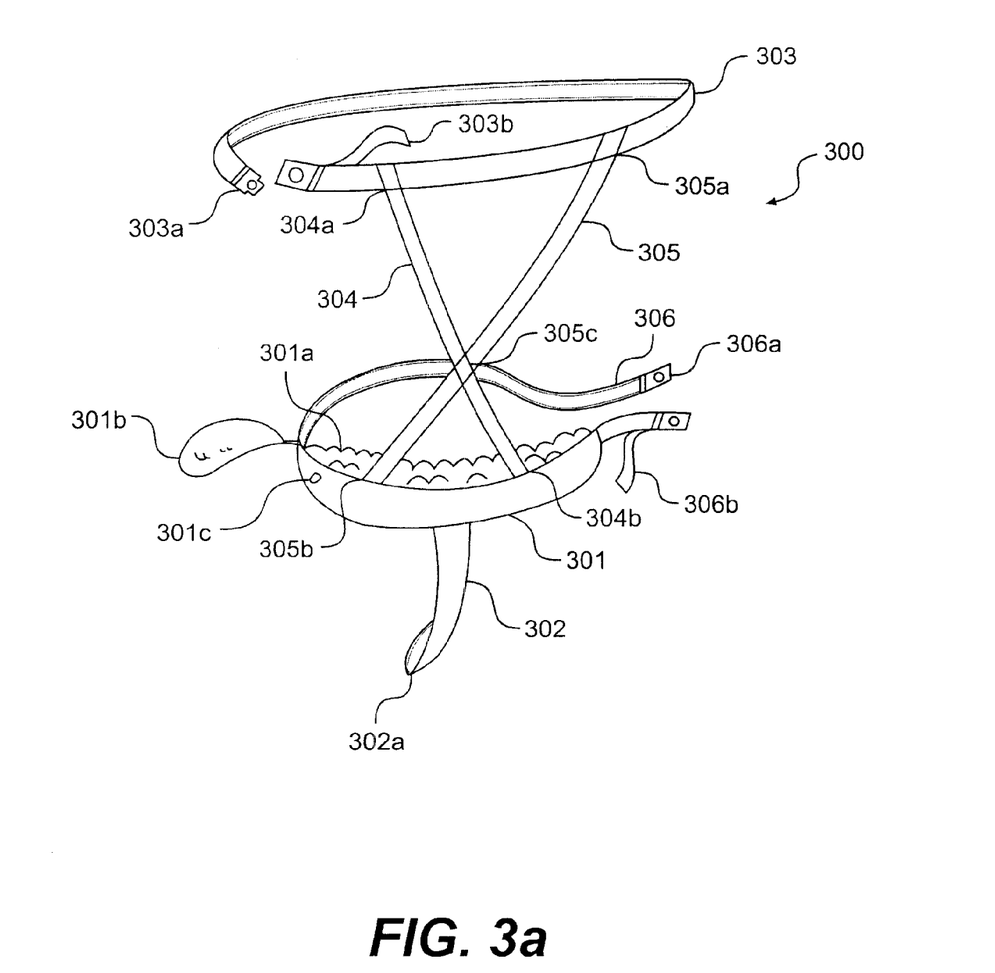
FIG. 3a is a schematic diagram of a third embodiment of a vehicle passenger safety device.

FIG. 3a is a schematic diagram of a third embodiment of a vehicle tis passenger safety device 300. In this embodiment, vehicle passenger safety device 300 comprises rigid front-support 301, inflatable cushion 301a, pump 301b, crotch strap 302 having loop 302a, horizontal strap 303, and a pair of cross-straps 304 and 305. Rigid front-support 301 is preferably made of tough polyurethane or another similar material. Belt 306, fastener 306a, and adjustable portion 306b are extensions of rigid front-support 301. Rigid front-support 301 either wraps around the back-support of the vehicle seat or snaps over the arms of the seat. Crotch strap 302 is attached to rigid front-support 301. Cross-straps 304 and 305 are attached to horizontal strap 303 at locations 304a and 305a, and they are attached to rigid front-support at locations 304b and 305b. In addition, cross-straps 304 and 305 are attached to each other at location 305c. Attachments of cross-straps 304 and 305 to each other and to horizontal strap 303 may be accomplished by sewing.

Figure 3B:
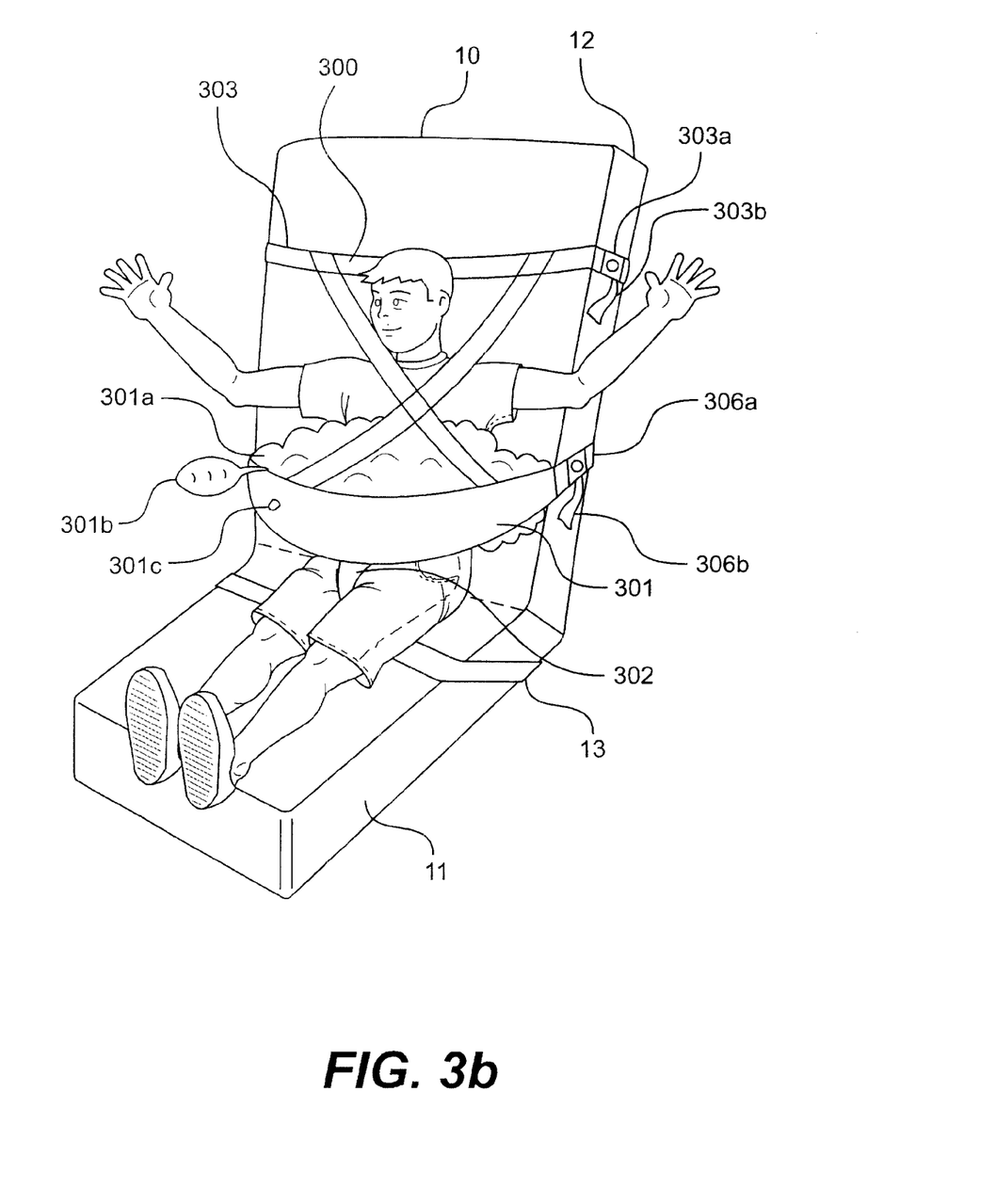
FIG. 3b is a schematic diagram of the vehicle passenger safety device of FIG. 3a shown in use on an existing vehicle seat.

FIG. 3b is a schematic diagram of vehicle passenger safety device 300 shown in use on an existing vehicle seat such as airplane seat 10 having an existing airplane seat belt 13. To install the passenger safety device 300, horizontal strap 303 is wrapped and tightened around existing back-support 12 of existing airplane seat 10. In a preferred embodiment, horizontal strap 303 is fastened by engaging fastener 303a and pulling adjustable portion 303b. Existing seat belt 13 is then fed through loop 302a and fastened. A passenger is then seated as shown in FIG. 3b between existing back-support 12 and rigid front-support 301 with crotch strap 302 between his legs. Cross-straps 304 and 305 are rested over the passenger's shoulders. Rigid front-support 301 is then fastened using belt 306 around back-support 12. After fastener 306a is engaged and adjustable portion 306b is pulled, inflatable cushion 301a is inflated to fill up the space between the passenger and rigid front-support 301 by using pump 301b. Other pumping systems, such as compressed gas or carbon dioxide cylinders can also be used.

To uninstall, inflatable cushion 301a is deflated through vent 301c. Horizontal strap 303 and belt 306 are detached, and the passenger is lifted out of seat-pan 11. Existing seat belt 13 is then unbuckled and removed from loop 302a. Inflatable cushion 301a is then folded and stored behind rigid front-support 301.

The foregoing disclosure of embodiments illustrating the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What I claim is:

1. A vehicle passenger safety device for securing a passenger on a vehicle seat that has a back-support and a seat belt, the device comprising:
    (a) a horizontal strap adapted to be fastened around the back-support;
    (b) two vertical straps, each having a first end attached to the horizontal strap adapted to extend from a back side of the back-support and a second end having a loop through which the seat belt is capable of being fed and fastened above the lap of the passenger, wherein the vertical straps are adapted to rest over the back-support and the passenger's shoulders; and
    (c) a strap-holding belt attached to the vertical straps at a position substantially above the second end of the vertical straps.

2. The device of claim 1, wherein each of the vertical straps is sewn to the horizontal strap at one or more locations.

3. The device of claim 1, wherein the strap-holding belt is sewn to the vertical straps.

4. The device of claim 1, wherein each of the loops has a hook-and-loop fastener.

5. The device of claim 1, wherein the horizontal strap and the strap-holding belt are length adjustable.

6. The device of claim 1, wherein the horizontal strap has a fastener and an adjustable portion.

7. The device of claim 1, wherein the strap-holding belt has a fastener and an adjustable portion.

8. A vehicle passenger safety device for securing a passenger on a vehicle seat has a vehicle seat back-support and a seat belt, the device comprising:
    (a) a seat-pan portion having a crotch strap on an interior side of the seat-pan portion and a loop on an exterior side of the seat-pan portion, wherein the seat-pan portion is adapted to be fastened to the vehicle seat by passing the seat belt through the loop and then fastening the seat belt;
    (b) a back-support portion having a horizontal strap and two vertical straps, wherein the back-support portion is adapted to be fastened to the vehicle seat back-support by wrapping the horizontal strap around the vehicle seat back-support; and
    (c) a hinge pivotally connecting the seat-pan portion and the back-support portion.

9. The device of claim 8, further comprising a rigid exterior frame and a padded interior.

10. The device of claim 8, wherein the horizontal strap is sewn to the vertical straps.

11. The device of claim 8, wherein the horizontal strap is length adjustable.

12. The device of claim 8, wherein the crotch strap is attached to the horizontal strap by a fastener.

13. The device of claim 8, further comprising a pair of legs located under the seat-pan.

14. The device of claim 8, further comprising a shoulder strap.

15. A vehicle passenger safety device for securing a passenger on a vehicle seat that has a back-support and a seat belt, the device comprising:
    (a) a rigid front-support;
    (b) an inflatable cushion attached to the rigid front-support;
    (c) a crotch strap having a first end attached to the rigid front-support and a second end having a loop;
    (d) a pair of cross-straps each of which having a first end attached to the rigid front-support and a second end; and
    (e) a horizontal strap attached to the second ends of the cross straps,
    wherein when the device is in use, the horizontal strap is fastened around the back-support and the passenger, the cross straps are rested over the passenger's shoulders, the seat belt is fed through the loop and fastened, and the inflatable cushion is inflated between the rigid front-support and the passenger.

16. The device of claim 15, further comprising a pump and a vent.

17. The device of claim 15, wherein the rigid front-support has a belt, a fastener, and an adjustable portion.

18. The device of claim 15, wherein the rigid front-support is made of polyurethane.

19. The device of claim 15, wherein the rigid front-support is length adjustable.

20. A safety device for integrating with a vehicle seat that has a back-support and a seat belt to secure a passenger on the vehicle seat, the device comprising:

(a) an upper portion having a horizontal strap adapted to be fastened around the back-support;

(b) two vertical straps attached to the upper portion and adapted to extend over the shoulders of the passenger, the vertical straps comprising a strap-holding belt attached to the two vertical straps; and (c) a lower portion having at least one loop and an extension, wherein the at least one loop is adapted to receive the seat belt to secure the device to the vehicle seat and the extension is adapted to be attached to the horizontal strap and the strap-holding belt.

21. The device of claim 20, wherein the vehicle seat is an airplane seat and the seat belt is a lap belt associated with the airplane seat.

22. A method for securing a passenger on a vehicle seat having a back-support and a seat belt, the method comprising the steps of:

feeding the seat belt through one or more loops of a safety device;

fastening the seat belt to secure the safety device onto the vehicle seat;

placing two vertical straps of the safety device over the shoulders of the passenger, wherein the vertical straps are attached to the one or more loops of the safety device;

wrapping a horizontal strap attached to the two vertical straps around the back-support; and fastening the horizontal strap to secure the passenger's torso against the back-support.

23. The method of claim 22, wherein the vehicle seat is an airplane seat and the belt is a lap belt associated with the airplane seat.

24. The method of claim 22, further comprising the step of fastening a strap-holding belt of the safety device to maintain a distance between the two vertical straps at a position substantially above the seat belt.

* * * * *